US008719582B2

(12) United States Patent
Neystadt et al.

(10) Patent No.: US 8,719,582 B2
(45) Date of Patent: May 6, 2014

(54) ACCESS CONTROL USING IDENTIFIERS IN LINKS

(75) Inventors: John Neystadt, Haifa (IL); Nir Nice, Kfar Vradim (IL)

(73) Assignee: Microsoft Corporation, Redmond, WA (US)

(*) Notice: Subject to any disclaimer, the term of this patent is extended or adjusted under 35 U.S.C. 154(b) by 778 days.

(21) Appl. No.: 12/396,500

(22) Filed: Mar. 3, 2009

(65) Prior Publication Data

US 2010/0228989 A1 Sep. 9, 2010

(51) Int. Cl.
*G06F 21/00* (2013.01)
*G06F 21/10* (2013.01)
*H04L 29/06* (2006.01)
*G07F 7/10* (2006.01)
*G06F 21/64* (2013.01)
*G06F 21/34* (2013.01)
*G06F 21/31* (2013.01)
*G06Q 20/34* (2012.01)

(52) U.S. Cl.
CPC ............ *G06F 21/10* (2013.01); *H04L 63/0428* (2013.01); *G07F 7/1008* (2013.01); *G06F 21/64* (2013.01); *G06F 21/34* (2013.01); *G06F 21/31* (2013.01); *H04L 63/083* (2013.01); *G06Q 20/341* (2013.01)
USPC ............... 713/185; 726/10; 713/182; 705/65; 705/66; 705/67; 705/68; 705/69

(58) Field of Classification Search
CPC ............... G06F 21/10; G06F 21/6218; G06F 2221/2107; G06F 21/64; G06F 21/34; G06F 21/31; H04L 9/03; H04L 63/0428; H04L 63/083; G07F 7/1008; G06Q 20/341
USPC .................................................. 713/185, 182
See application file for complete search history.

(56) References Cited

U.S. PATENT DOCUMENTS

| 6,088,451 | A | * | 7/2000 | He et al. ............................. 726/8 |
| 7,415,439 | B2 | | 8/2008 | Kontio et al. |
| 7,668,830 | B2 | * | 2/2010 | Hakala ............................ 713/154 |
| 2002/0141594 | A1 | * | 10/2002 | MacKenzie et al. .......... 380/286 |
| 2002/0147929 | A1 | * | 10/2002 | Rose ............................. 713/201 |

(Continued)

FOREIGN PATENT DOCUMENTS

| KR | 20010091080 | A | * | 10/2001 | ............... H04Q 7/24 |
| KR | 1020010091080 | A | | 10/2001 | |

(Continued)

OTHER PUBLICATIONS

Espacenet search, Espacenet Result list, Oct. 2011.*

(Continued)

*Primary Examiner* — Andy Rao
*Assistant Examiner* — Shan Elahi
(74) *Attorney, Agent, or Firm* — Ben Tabor; Kate Drakos; Micky Minhas

(57) ABSTRACT

Methods, systems, and computer-readable media are disclosed for access control. A particular method receives a resource access identifier associated with a shared computing resource and embeds the resource access identifier into a link to the shared resource. The link to the shared resource is inserted into an information element. An access control scheme is associated with the information element to generate a protected information element, and the protected information element is sent to a destination computing device.

20 Claims, 10 Drawing Sheets

(56) References Cited

U.S. PATENT DOCUMENTS

| | | | |
|---|---|---|---|
| 2003/0014750 A1* | 1/2003 | Kamen | 725/25 |
| 2003/0144869 A1* | 7/2003 | Fung et al. | 705/1 |
| 2004/0148503 A1 | 7/2004 | Sidman | |
| 2005/0099612 A1* | 5/2005 | Kirovski | 355/53 |
| 2005/0165937 A1* | 7/2005 | Genevois | 709/229 |
| 2006/0041484 A1 | 2/2006 | King et al. | |
| 2007/0055887 A1 | 3/2007 | Cross et al. | |
| 2007/0150299 A1 | 6/2007 | Flory | |
| 2008/0168568 A1 | 7/2008 | Brodersen et al. | |
| 2008/0313150 A1* | 12/2008 | Penner et al. | 707/3 |
| 2011/0231555 A1* | 9/2011 | Ebrahimi et al. | 709/226 |

FOREIGN PATENT DOCUMENTS

| | | | | |
|---|---|---|---|---|
| KR | 1020060090044 A | | 8/2006 | |
| KR | 20060090044 A | * | 10/2006 | G06F 15/00 |
| WO | 2005121994 A1 | | 12/2005 | |
| WO | 2006112617 A1 | | 10/2006 | |

OTHER PUBLICATIONS

Rfc4758, Cryptographic Tokey Key Initialization Protocol V1.0 Rev1, Nov. 2006.*

PKCS-11V2-20, Cryptographic Token Interface Standard, Jun. 2004.*

Notice on the First Office Action received from the State Intellectual Property Office of the Peoples's Republic of China, for Application No. 201080010827.0, dated Sep. 2, 2013, with English translation, 14 pages.

"European Search Report" from the European Patent Office for European Application No. 10749132.6; Patent No. PCT/US2010/025675, Date Mailed: Apr. 16, 2013, pp. 5.

"International Search Report and Written Opinion" from the International Searching Authority (ISA/KR) for International Application No. PCT/US2010/025675, Date Mailed: Sep. 27, 2010, International Filing Date: Feb. 26, 2010, pp. 9.

"Security Mechanisms", Retrieved at<<https://metro.dev.java.net/guide/Security_Mechanisms.html>>, Nov. 19, 2008, pp. 3.

Nair, et al. "Enabling DRM-Preserving Digital Content Redistribution", Retrieved at<<http://www.cs.vu.nl/~ast/publications/cec-2005.pdf>>, pp. 8.

Shin, et al. "Position Paper for W3C DRM Workshop", Retrieved at<<http://www.w3.org/2000/12/drm-ws/pp/accessticket.html>>, Nov. 19, 2008, pp. 6.

* cited by examiner

ACCESS CONTROL USING IDENTIFIERS IN LINKS

BACKGROUND

Enterprises face numerous challenges when trying to control access to sensitive information. For example, the challenges may include restricting access for a specific resource to a limited set of users, revoking a user's access to a resource when the user's role within the enterprise changes, and applying access control changes to enterprise resources when the enterprise's security policies change.

Typically, enterprises restrict access to resources on a need-to-know basis. That is, enterprises typically create security policies that grant access to only those users that need access to a resource, while simultaneously denying access to users that do not need access to the resource. Access control usually involves maintaining an access list of authorized users for each resource and only allowing those authorized users to access each particular resource. Access lists are updated by either by resource owners or some other authorized party when an enterprise's security policies change. Often, resource owners try to save time and money by listing more users than necessary in an access list, to avoid frequently updating the access list. However, this practice may cause security vulnerabilities at the enterprise.

Enterprises usually have multiple groups of professionals, such as business professionals, administrative professionals, and information technology (IT) professionals. Generally, an enterprise's access controlled resources are controlled by its business professionals. However, because most enterprises consider access control a technical task, IT professionals, and not business professionals, typically manage the access lists for the access controlled resources. This may lead to business process inefficiencies, because one group knows who should have access but cannot grant access, while the other group can grant access but does not know who should have access.

SUMMARY

The present disclosure describes controlling access to a shared resource by embedding an identifier that grants access to the shared resource in a link to the shared resource and then forwarding the link to one or more destination computing devices. A resource owner or other party wishing to grant access to a shared computing resource receives a resource access identifier, such as a random cryptographic token, associated with the shared computing resource. The resource access identifier is embedded in a link to the shared computing resource, and the link is entered into an information element, such as an e-mail, instant message, or file. An access control scheme, such as a digital rights management (DRM) profile, is associated with the information element to generate a protected information element, and the protected information element is sent to a destination computing device.

An access control scheme associated with a protected information element may include a list of computing devices authorized to access the protected information element. When the list includes the destination computing device, the destination computing device may use the link and the resource access identifier in the protected information element to access the shared computing resource. The destination computing device may also grant other computing devices access to the shared computing resource by forwarding the protected information element to the other computing devices.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

In a particular embodiment, a method is disclosed that includes receiving a resource access identifier that is associated with a shared computing resource, such as an application, a service, a database, or a file The method also includes embedding the resource access identifier into a link to the shared computing resource and inserting the link into an information element. Examples of information elements include an e-mail, an instant message, and a file. The method includes associating an access control scheme with the information element to generate a protected information element and sending the protected information element to a destination computing device.

In another particular embodiment, a system is disclosed that includes a first computing device and a network interface. The first computing device is configured to send a request for a resource access identifier that allows access to a shared resource and to receive the resource access identifier. The first computing device is also configured to embed the resource access identifier into a link, to insert the link into an information element, and to associate an access control scheme with the information element. The network interface may send the information element to a second computing device that is capable of verifying that the access control scheme associated with the information element allows access to the information element. For example, when the access control scheme is a digital rights management (DRM) profile, the second computing device may verify that the DRM profile indicates that the second computing device is either an owner of the shared resource or has been granted access to the shared resource by an owner of the shared resource.

In another particular embodiment, a computer-readable medium is disclosed. The computer-readable medium includes instructions, that when executed by a processor of an access gateway, cause the processor to receive at the access gateway, a request from a first device for a cryptographic token. The requested cryptographic token allows access, via the access gateway, to a shared resource located at a file server. The computer-readable medium also includes instructions, that when executed by the processor, cause the processor to send the cryptographic token from the access gateway to the first device. The computer-readable medium also includes instructions, that when executed by the processor, cause the processor to receive, at the access gateway, an attempt from a second device to access the shared resource using the cryptographic token. The computer-readable medium also includes instructions, that when executed by the processor, cause the processor to facilitate access to the shared resource by the second device via the access gateway.

Figure 1:
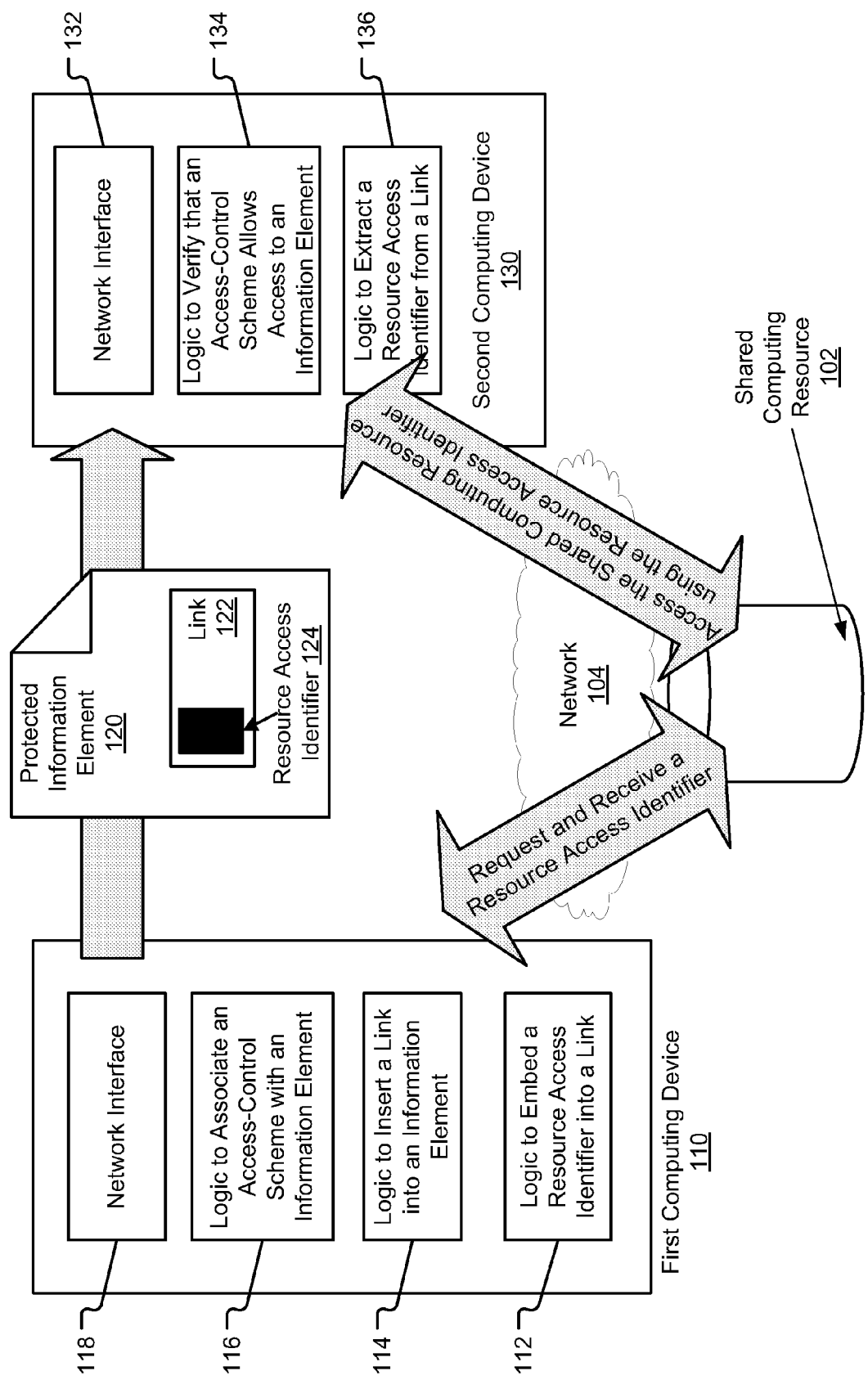
FIG. 1 is a block diagram of a particular embodiment of a system of access control that uses identifiers in links.

FIG. 1 illustrates a block diagram of a particular embodiment of a system 100 of access control that uses identifiers in links. The system 100 includes a shared computing resource 102 and one or more computing devices. For example, in the particular embodiment illustrated in FIG. 1, the system 100 includes a first computing device 110 and a second computing device 130. The shared computing resource 102 may be a file, an application, a service, a database, or any other computing resource. The shared computing resource 102 is capable of being accessed by both the first computing device 110 and the second computing device 130. In a particular embodiment, the shared computing resource 102 is accessible by the first computing device 110 and the second computing device 130 via a network 104. For example, the network 104 may be a local area network (LAN), a wide area network (WAN), or the Internet. In a particular embodiment, the shared computing resource 102 may be located at a file server, an application server, or a database server accessible via the network 104.

The first computing device 110 may be configured to send data (e.g., a protected information element 120 including a resource access identifier 124 embedded in a link 122) to the second computing device 130 via a network interface 118. By way of example, and not limitation, the protected information element 120 may be an e-mail, an instant message, or a file. The system 100 of FIG. 1 may provide access control using identifiers (e.g., the resource access identifier 124) in links (e.g., the link 122).

The first computing device 110 is configured to request and receive the resource access identifier 124 associated with the shared computing resource 102. In a particular embodiment, the resource access identifier 124 is associated with the shared computing resource 102 and is used to access the shared computing resource 102. The first computing device 110 may also include various logic modules configured to perform specific functionality at the first computing device 110. For example, the first computing device 110 may include logic to embed a resource access identifier into a link 112, logic to insert a link into an information element 114, and logic to associate an access control scheme with an information element 116. In a particular embodiment, the logic to associate an access control scheme with an information element 116 may be configured to associate an access control scheme with an information element to generate the protected information element 120. For example, the logic to associate an access control scheme with an information element 116 may request a DRM server to create a DRM profile for the information element. The first computing device 110 may send the protected information element 120 via the network interface 118 to the second computing device 130.

The protected information element 120 includes the link 122, and the resource access identifier 124 is embedded in the link 122. In a particular embodiment, the protected information element 120 may be an e-mail, an instant message, or a file, and the access control scheme may be a digital rights management (DRM) profile. In another particular embodiment, the link 122 may be a uniform resource locator (URL), and the resource access identifier 124 may be a random cryptographic token embedded into the URL as a parameter of the URL. For example, if the shared computing resource 102 is a document with the URL "https://fileserver.enterprise.com/viewfile.action?filename=businessplan.doc" and the resource access identifier is the random cryptographic token "cvtjofttqmbo" then the URL inserted in the protected information element may be "https://fileserver.enterprise.com/viewfile.action?filename=businessplan.doc&RAID=cvtjofttqmbo".

The second computing device 130 may be configured to receive the protected information element 120 from the first computing device 110 a the network interface 132. The second computing device 130 may also include various logic modules configured to perform specific functionality. For example, the second computing device 130 may include logic to verify that an access control scheme allows access to an information element 134 and logic to extract a resource access identifier from a link 136. The second computing device 130 may also be configured to access the shared computing resource 102 using the received resource access identifier 124.

In operation, the first computing device 110 may elect to grant the second computing device 130 access to the shared computing resource 102. To do so, the first computing device 110 may request and receive the resource access identifier 124 associated with the shared computing resource 102 from the shared computing resource 102. Upon receiving the resource access identifier 124, the logic to embed a resource access identifier into a link 112 at the first computing device 110 may embed the resource access identifier 124 into the link 122. The logic to insert a link into an information element 114 may then insert the link 122, including its embedded resource access identifier 124, into an information element.

In a particular embodiment, because the resource access identifier 124 may be used to access the shared resource 102, any computing device that possesses either the resource access identifier 124 or the link 122 containing the resource access identifier 124 may be able to access the shared computing resource 102. To maintain specific control over which devices may access the information element to extract either the link 122 or the resource access identifier 124, the logic to associate an access control scheme with an information element 116 at the first computing device 110 may associate an access control scheme with the information element to generate the protected information element 120. In a particular embodiment, the access control scheme may include a list of devices that may access the protected information element 120. For example, the access control scheme may specify that the second computing device 130 may access the protected information element 120. The access control scheme may also be used to prevent unauthorized redistribution of the protected information element 120, by preventing unauthorized recipients of the protected information element 120 from accessing the shared resource 102. The first computing device 110 may then send, via the network interface 118, the protected information element 120 to the second computing device 130.

Upon receiving the protected information element 120, the logic to verify that an access control scheme allows access to an information element 134 may verify that the access control scheme associated with the protected information element 120 allows access to the protected information element 120 at the second computing device 130. For example, the logic to verify that an access control scheme allows access to an information element 134 may verify that the second computing device 130 is listed in the access control scheme associated with the protected information element 120. When the second computing device 130 is listed in the access control scheme associated with the protected information element 120, the logic to extract a resource access identifier from a link 136 may extract the resource access identifier 124 from the link 122 in the protected information element 120. For example, in the embodiment discussed above, the logic to extract a resource access identifier from a link 136 may extract the cryptographic token "cvtjofttqmbo" from the URL "https://fileserver.enterprise.com/viewfile.action?filename=businessplan.doc&RA ID=cvtjofttqmbo". The second computing device 130 may then access the shared computing resource 102 using the resource access identifier 124. In a particular embodiment, instead of extracting the resource access identifier 124 from the link 122, the second computing device 130 may simply access the shared computing resource 102 via the link 122, because the resource access identifier 124 is embedded in the link 122. For example, the second computing device may simply access the document by using the entire link "https://fileserver.enterprise.com/viewfile.action?filename=businessplan.doc&RA ID=cvtjofttqmbo".

It will be appreciated that the system 100 of FIG. 1 enables a computing device that has access to a shared computing resource (e.g., the shared computing resource 102) to selectively grant access to the shared computing resource to other computing devices. It will also be appreciated that the system 100 of FIG. 1 simplifies resource sharing by embedding resource access identifiers into links to the resource, eliminating the need for the shared computing resource to maintain an access list. Furthermore, in case the protected information element is accidentally forwarded to an unauthorized computing device, this does not create a security problem, because the unauthorized computing device will not be able to access the protected information element since the unauthorized computing device is not in the access control scheme associated with the protected information element.

Figure 2:
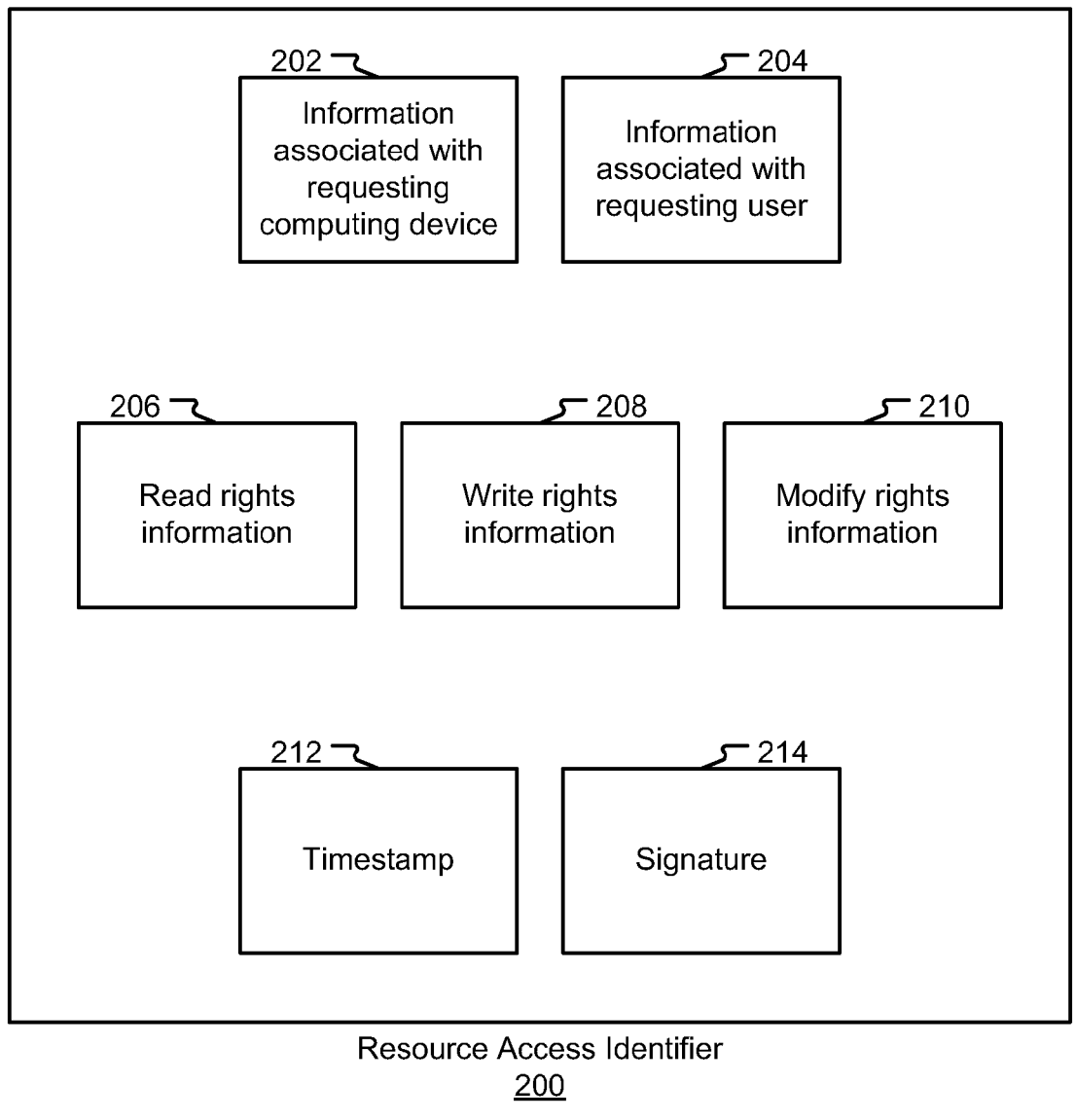
FIG. 2 is a block diagram of a particular embodiment of a resource access identifier that may be used to perform access control using identifiers in links.

FIG. 2 is a block diagram of a particular embodiment of a resource access identifier 200 that may be used to perform access control using identifiers in links. In an illustrative embodiment, the resource access identifier 200 includes the resource access identifier 124 of FIG. 1.

The resource access identifier 200 may include information associated with an entity that requested the resource access identifier 200. For example, the resource access identifier 200 may include information associated with a requesting computing device 202, information associated with a requesting user 204, or any combination thereof. The information associated with a requesting computing device 202 may include a computing device Internet protocol (IP) address, a computing device name, or any other information capable of identifying a computing device. The information associated with a requesting user 204 may include a user identifier, user name, user e-mail address, or any other information capable of identifying a user.

The resource access identifier 200 may also include information regarding the rights that are granted to a receiving device when the resource access identifier 200 is successfully used to access a shared computing resource. For example, the resource access identifier 200 may include read rights information 206, write rights information 208, modify rights information 210, or any combination thereof. The read rights information 206 may include how many times the resource access identifier 200 may be used to read a shared computing resource and the particular portions of the shared computing resource that may be read. The write rights information 208 may include how many times the resource access identifier 200 may be used to write to a shared computing resource and the particular portions of the shared computing resource that may be written to. The modify rights information 210 may include how many times the resource access identifier 200 may be used to modify a shared computing resource and the particular portions of the shared computing resource that may be modified.

The resource access identifier 200 may also include a timestamp 212. The timestamp 212 may indicate when the resource access identifier 200 was requested, when the resource access identifier 200 was created, or when the resource access identifier 200 was sent to a requesting computing device or user. In a particular embodiment, when the resource access identifier 200 includes the timestamp 212, the resource access identifier 200 may expire once a predefined time period from the timestamp has elapsed. That is, the resource access identifier 200 may no longer be used to access the shared computing resource once the predefined time period from the timestamp 212 has elapsed. For example, when the resource access identifier 200 has the timestamp 212 of "8 am, Jan. 1, 2009" and enterprise security policies indicate that resource access identifiers may only be valid for 48 hours, then the resource access identifier 200 expires at 8 am on Jan. 3, 2009. When an enterprise desires to track valid resource access identifiers, setting a validity time period for resource access identifiers makes the tracking process easier, because the enterprise only needs to track resource access identifiers for the validity time period (e.g., in the example above, the enterprise would only need to track the resource access identifier 200 for 48 hours).

The resource access identifier 200 may also include a signature 214. The signature 214 may prevent unauthorized modification of the resource access identifier 200. For example, when the resource access identifier 200 is created, the signature 214 may be a first signature. If the resource access identifier 200 is subsequently modified, then the signature 214 may automatically change from the first signature to a second signature that is different from the first signature. Then, when the resource access identifier 200 is used to access the shared computing resource, access may be denied because the signature 214 in the resource access identifier 200 would not match the first signature, i.e., the signature 214 indicates that the resource access identifier 200 has been modified since being created. By way of example, and not limitation, the signature 214 may be a hash value associated with the resource access identifier 200 or a checksum value associated with the resource access identifier 200.

In operation, the resource access identifier 200 may be associated with a particular shared computing resource and may be received by a first computing device that elects to grant a second computing device access to the particular shared computing resource. For example, the first computing device 110 of FIG. 1 may receive the resource access identifier 124 associated with the shared computing resource 102. After being received at the first computing device, the resource access identifier 200 may be embedded by the first computing device into a link to the particular shared computing resource. For example, the first computing device 110 of FIG. 1 may embed the resource access identifier 124 into the link 122. The resource access identifier 200 may also be used by the second computing device to access the particular shared computing resource. For example, the second computing device 130 of FIG. 1 may use the resource access identifier 124 to access the shared computing resource 102.

It will be appreciated that the resource access identifier 200 may identify the device or user that requested the resource access identifier 200. When the requesting device or user is the owner of the shared computing resource associated with the resource access identifier 200, the resource access identifier 200 may be used to instantly identify the owner of the shared computing resource, even after the resource access identifier 200 has been forwarded from one computing device to another since its creation. It will also be appreciated that by including information regarding read, write, and modification rights, the resource access identifier 200 may eliminate the need for the shared computing resource to track similar information. This reduces the amount of data and processing logic needed at the shared computing resource. It will also be appreciated that the resource access identifier 200 supports security measures, such as an expiration date and a signature to prevent unauthorized modification.

Figure 3:
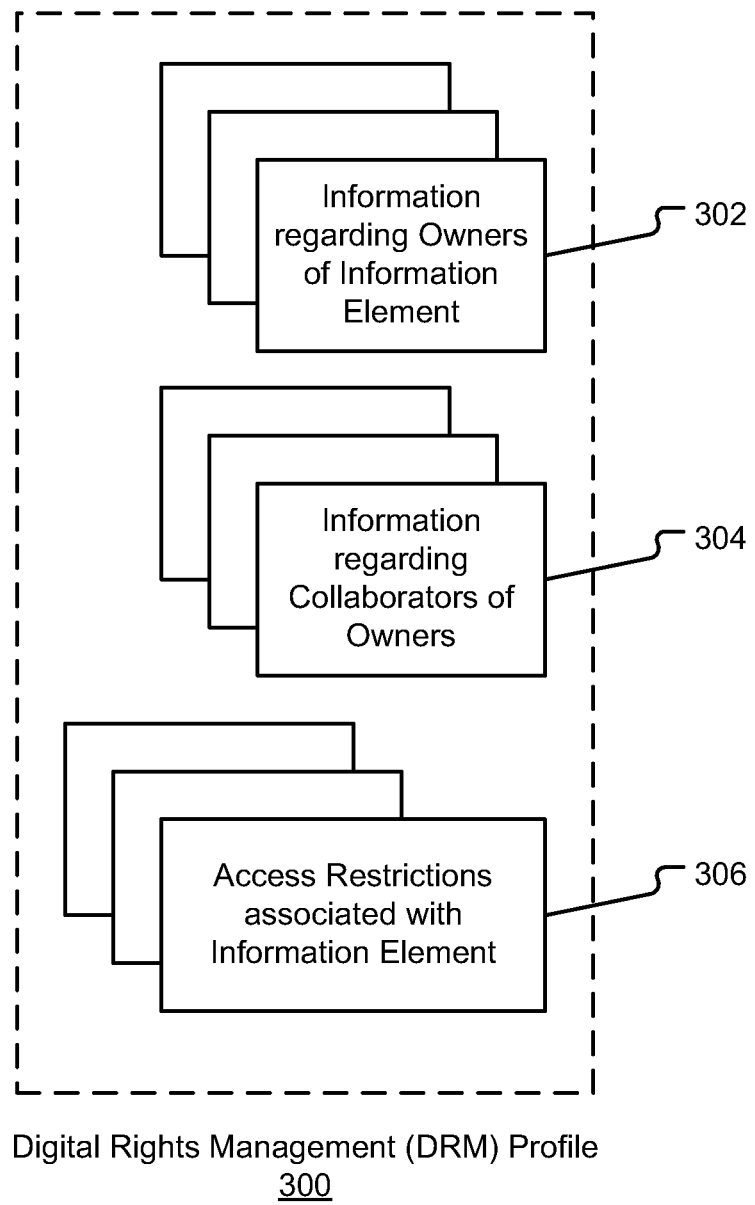
FIG. 3 is a block diagram of a particular embodiment of a digital rights management (DRM) profile that may be used in access control using identifiers in links.

FIG. 3 is a block diagram of a particular embodiment of a digital rights management (DRM) profile 300 that may be used in access control using identifiers in links. The DRM profile 300 may include information regarding one or more owners of an information element 302, information regarding one or more collaborators of the owners 304, and one or more access restrictions associated with the information element 306. For example, the DRM profile may include access restrictions associated with the information element such as whether the information element may be printed, copied, or deleted. In an illustrative embodiment, the DRM profile 300 is associated with an information element by the logic to associate an access control scheme with an information element 116 of FIG. 1 at the first computing device 110 to generate the protected information element 120 of FIG. 1.

The information regarding one or more owners of an information element 302 may include an identifier associated with a user that created the information element or an identifier associated with a computing device that was used to create the information element. In an illustrative embodiment, the information regarding one or more owners of an information element 302 may include information indicating that the first computing device 110 of FIG. 1 is an owner of the protected information element 120.

The information regarding one or more collaborators of the one or more owners 304 may include identifiers associated with users, other than the owners of the information element, who should be granted access to the information element. In an illustrative embodiment, the information regarding one or more collaborators of the one or more owners 304 may include information indicating that the second computing device 130 of FIG. 1 is a collaborator of the first computing device 110 of FIG. 1 and should be granted access to the information element.

The access restrictions associated with the information element 306 may include whether an owner of the information element may read, write, or modify the information element and whether a collaborator of an owner of the information element may read, write, or modify the information element. The access restrictions associated with the information element 306 may also include a maximum number of collaborators for the information element, how many times the information element may be forwarded, and how many times the information element may be duplicated. In an illustrative embodiment, the access restrictions associated with an information element 306 may include information indicating that the first computing device 110 of FIG. 1 may transmit the protected information element 120 to the second computing device 130 and that the second computing device 130 may not forward the protected information element 120.

In operation, the DRM profile 300 may be associated with a particular information element to generate a particular protected information element. For example, a resource owner may include a list of owners (e.g., "Sam") and owner groups (e.g., "Sales Department") and a list of collaborators (e.g., "John") and collaborator groups (e.g., "Finance Department") in the DRM profile. Once created, the DRM profile 300 may then be used to restrict access to the particular protected information element to only those entities that are listed in either the information regarding one or more owners of the information element 302 or the information regarding one or more collaborators of the owners 304. The DRM profile 300 may also be used to prevent the protected information element from being improperly forwarded or duplicated without authorization.

It will be appreciated that the DRM profile 300 of FIG. 3 may function as an access list for an information element by preventing any entity that is neither an owner nor a collaborator from accessing the information element. It will further be appreciated that when both a resource access identifier and the DRM profile 300 are embedded in a link, persistent protection for the shared computing resource is achieved, and users cannot bypass security by simply extracting the link from a protected information element and forwarding the link using an unprotected information element. When the DRM profile 300 is embedded in the link along with an embedded resource access identifier, both the "key" to the shared computing resource (i.e., the embedded resource access identifier) and the list of who should be allowed to use the "key" (i.e., the embedded DRM profile) are included in the link. In a particular embodiment, the DRM profile 300 is a Rights Management Services (RMS) profile based on the Rights Management Services technology from Microsoft Corp.

Figure 4:
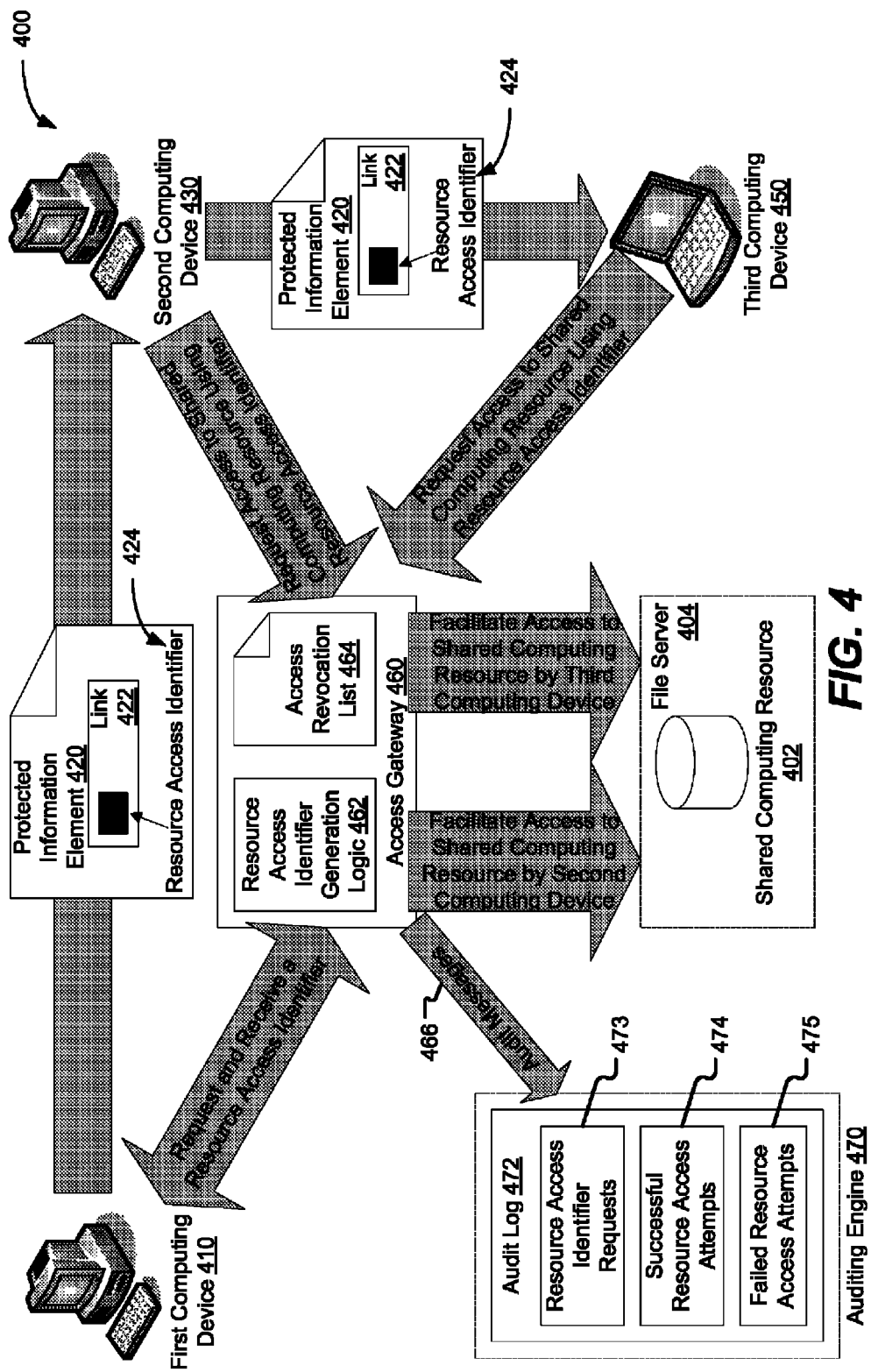
FIG. 4 is a block diagram of another particular embodiment of a system of access control that uses identifiers in links.

FIG. 4 is a block diagram of another particular embodiment of a system 400 of access control that uses identifiers in links. The system includes a first computing device 410 capable of sending a protected information element 420 to a second computing device 430 and a third computing device 450 capable of receiving the protected information element 420 from the second computing device 430. The system also includes an illustrative shared computing resource 402 at a file server 404 accessible by the first computing device 410, the second computing device 430, and the third computing device 450 via an access gateway 460. In a particular embodiment, the system also includes an auditing engine 470 configured to receive information from the access gateway 460. In an illustrative embodiment, the first computing device 410 includes the first computing device 110 of FIG. 1, the second computing device 430 includes the second computing device 130 of FIG. 1, and the shared computing resource 402 includes the shared computing resource 102 of FIG. 1. It should be noted that the specific configuration including computing devices and one shared computing resource illustrated in the particular embodiment of FIG. 4 is for example only, and that the system 400 may include any number of computing devices and shared computing resources.

The file server 404 may be configured to provide access to the shared computing resource 402 via the access gateway 460. In a particular embodiment, the file server 404 may also deny attempts to access the shared resource 402 that are not made via the access gateway 460. The shared computing resource 402 at the file server 404 may include a file, an application, a service, a database, a data object, or any other computing resource. In a particular embodiment, the file server 404 may be accessible by the access gateway 460 via a network, such as a local area network (LAN), a wide area network (WAN), or the Internet.

The first computing device 410 is configured to request and receive a resource access identifier 424 associated with the shared computing resource 402 at the file server 404 from the access gateway 460. The first computing device 410 may also be configured to embed the received resource access identifier 424 into a link 422 to the shared computing resource 402 and to insert the link 422 into an information element (e.g., an e-mail, an instant message, or a file). The first computing device 410 may also be configured to associate an access control scheme with the information element to generate a protected information element 420 and send the protected information element 420 to the second computing device 430. In an illustrative embodiment, the resource access identifier 424 includes the resource access identifier 200 of FIG. 2, and the access control scheme includes the DRM profile 300 of FIG. 3.

The protected information element 420 may include the link 422 and the resource access identifier 424 may be embedded in the link 422. In an illustrative embodiment, the protected information element 420 includes the protected information element 120 of FIG. 1, the link 422 includes the link 122 of FIG. 1, and the resource access identifier 424 includes the resource access identifier 124 of FIG. 1.

Each of the second computing device 430 and the third computing device 450 may be configured to verify that the access control scheme associated with the protected information element 420 allows access to the protected information element 420. In illustrative embodiment, the second computing device 430 verifies that information that identifies the second computing device 430 as either an owner or a collaborator with respect to the protected information element 420 is present in the DRM profile 300 of FIG. 3. In another illustrative embodiment, the third computing device 450 verifies that information that identifies the third computing device 450 as either an owner or a collaborator with respect to the protected information element 420 is present in the DRM profile 300 of FIG. 3. The second computing device 430 and the third computing device 450 may also be configured to use the link 422 and the resource access identifier 424 to request access to the shared computing resource 402 at the file server 402 via the access gateway 460.

The access gateway 460 may be configured to generate the resource access identifier 424 at the resource access identifier generation logic 462 and transmit the generated resource access identifier 424 to the first computing device 410. The access gateway 460 may also be configured to receive access requests based on the link 422 and the resource access identifier 424 from other computing devices, such as the second computing device 430 and the third computing device 450. The access gateway 460 may also be configured to facilitate access to the shared computing resource 402 at the file server 404 by the second computing device 430 and the third computing device 450. For example, when the shared computing resource 402 is a file, the access gateway 460 verifies that the resource access identifier 424 grants access to the shared computing resource 402, retrieves a copy of the shared computing resource 402, and sends the copy of the shared computing resource 402 to the second computing device 430 or the third computing device 450. As another example, when the shared computing resource 402 is an application, a service, or a database, the access gateway 460 verifies that the resource access identifier 424 grants access to the shared computing resource 402 and opens a network connection between the second computing device 430 or the third computing device 450 and the file server 404 via the access gateway 460.

In a particular embodiment where the access control scheme includes a list of initially authorized devices for a particular information element but does not reflect subsequent changes to the list of authorized devices, the access gateway 460 also maintains an access revocation list 464. The access revocation list 464 may include a list of computing devices and users who are prohibited from accessing the shared computing resource 402 even if the computing devices and users possess a valid resource access identifier. For example, if the third computing device 450 is listed in the access revocation list 464, an attempt by the third computing device 450 to access the shared computing resource 402 using the otherwise valid resource access identifier 424 may be denied. A particular computing device or a particular user may be added to the access revocation list 464 when the role of the particular device or user within an enterprise changes (e.g. when a particular computer is no longer assigned to an owner of a particular resource or when a particular user no longer works in a group that needs access to a particular resource). A particular computing device or a particular user may also be added to the access revocation list as a result of a change in an enterprise's security policies (e.g., a policy decision that users outside an enterprise's finance department may no longer access payroll records).

In a particular embodiment, the system 400 of FIG. 4 supports auditing to keep track of resource access identifier requests and attempts to use resource access identifiers to access shared computing resources. An auditing engine, such as the auditing engine 470, may implement auditing. When the system 400 of FIG. 4 includes the auditing engine 470, the access gateway 460 may be configured to send one or more audit messages 466 to the auditing engine 470. In a particular embodiment, the access gateway 460 sends the audit messages 466 to the auditing engine 470 each time a resource access identifier is requested from the access gateway 460 and each time an attempt to access shared computing resources is received at the access gateway 460. For example, the access gateway 460 may send audit messages 466 to the auditing engine 470 when the first computing device 410 requests the resource access identifier 424, when the second computing device 430 attempts to access the shared computing resource 402, and when the third computing device 450 attempts to access the shared computing resource 402. In a particular embodiment, the auditing engine 470 is located at the access gateway 460, and the audit messages 466 are internal messages of the access gateway 460.

The auditing engine 470 may include an audit log 472. In a particular embodiment, the audit log 472 includes entries for resource access identifier requests 473, successful resource access attempts 474, and failed resource access attempts 475, based on the audit messages 466 received from the access gateway 460. For example, an entry in the resource access identifier requests 473 may be made when the first computing device 410 requests the resource access identifier 424 from the access gateway 460, and entries in the successful resource access attempts 474 may be made when the second computing device 430 and the third computing device 450 access the shared computing resource 402 via the access gateway 460. In the example discussed above where the third computing device 450 is listed in the access revocation list 464, an entry in the failed resource access attempts 475 may be made when the access gateway 460 denies the attempt by the third computing device 450 to access the shared computing resource 402.

In operation, the first computing device 410 may grant the second computing device 430 access to the shared computing resource 402 at the file server 404. To do so, the first computing device 410 may request a resource access identifier associated with the shared computing resource 402 from the access gateway 460. In response to receiving the request from the first computing device 410, the access gateway 460 may generate the resource access identifier 424 using the resource access identifier generation logic 462, and send the resource access identifier 424 to the first computing device 410. In a particular embodiment, the access gateway 460 may refuse the request if the first computing device 410 is listed in the access revocation list 464. By doing so, the access gateway 460 may prevent computing devices whose own access to the shared resource 402 has been revoked from granting other computing devices access to the shared computing resource 402. The access gateway 460 may also send one or more audit messages 466 to the auditing engine 470 indicating that the first computing device 410 requested the resource access identifier 424, and the audit engine 470 may make a corresponding entry in the resource access identifier requests 473 portion of the audit log 472.

The first computing device 410 may embed the received resource access identifier 424 into a link 422 to the shared computing resource 402, insert the link 422 into an information element, associate an access control scheme with the information element to generate the protected information element 420, and send the protected information element 420 to the second computing device 430. In a particular embodiment, the resource access identifier 424 is a random cryptographic token, the link 422 is a uniform resource locator (URL), and the random cryptographic token is embedded in the URL as a parameter of the URL. In another particular embodiment, the access control scheme associated with the protected information element 420 may be a DRM profile, such as the DRM profile 300 of FIG. 3. For example, in the example discussed with reference to FIG. 1, the URL with the embedded cryptographic token (i.e., "https://fileserver.enterprise.com/viewfile.action?filename=businessplan.doc&RAID=cvtjofttqmbo") may be inserted into an e-mail, the e-mail may be protected by a DRM profile, and the e-mail may be sent. In a particular embodiment, protecting the e-mail with a DRM profile may encrypt the e-mail, as described in further detail with respect to FIG. 5. In another particular embodiment, the resource access identifier 424 may be requested, received, and embedded by a collaboration application at the first computing device 410, such as an e-mail application, a word processing application, a spreadsheet application, a presentation application, a web browser, a file sharing application, or a multimedia application.

Upon receiving the protected information element 420, the second computing device 430 may verify that the access control scheme associated with the protected information element 420 allows the second computing device 430 to access to the protected information element 420. For example, the second computing device 430 may detect that the protected information element 420 is encrypted and attempt to retrieve a decryption key to decrypt the e-mail, as described in further detail with respect to FIG. 5. When the access control scheme allows access, the second computing device 430 may use the resource access identifier 424 to request the access gateway 460 to provide access to the shared computing resource 402, and the access gateway 460 may facilitate the access to the shared computing resource 402. In a particular embodiment, the access gateway 460 facilitates access to the shared computing resource 402 when the second computing device 430 is not listed in the access revocation list 464 and denies access to the shared computing resource 402 when the second computing device 430 is listed in the access revocation list 464. The access gateway 460 may also send one or more audit messages 466 to the auditing engine 470 indicating whether the second computing device 430 succeeded or failed in accessing the shared computing resource 402, and the audit engine 470 may make a corresponding entry in either the successful resource access attempts 474 portion or the failed resource access attempts 475 portion of the audit log 472.

The second computing device 430 may also forward the protected information element 420 to the third computing device 450. Upon receiving the protected information element 420, the third computing device 450 may verify that the access control scheme associated with the protected information element 420 allows the third computing device 450 to access the protected information element 420. When the access control scheme allows access, the third computing device 450 may use the resource access identifier 424 to request the access gateway 460 for access to the shared computing resource 402, and the access gateway 460 facilitates the access to the shared computing resource 402. In a particular embodiment, the access gateway 460 facilitates access to the shared computing resource 402 when the third computing device 450 is not listed in the access revocation list 464 and denies access to the shared computing resource 402 when the third computing device 450 is listed in the access revocation list 464. The access gateway 460 may also send one or more audit messages 466 to the auditing engine 470 indicating whether the third computing device 450 succeeded or failed in accessing the shared computing resource 402, and the audit engine 470 may make a corresponding entry in either the successful resource access attempts 474 portion or the failed resource access attempts 475 portion of the audit log 472.

It will be appreciated that the system 400 of FIG. 4 enables resource access identifiers to be forwarded between different collaborators. It will also be appreciated that the system 400 of FIG. 4 enables access revocation, so that the system 400 of FIG. 4 may keep up with changing user roles and organizational policies. It will also be appreciated that the system 400 of FIG. 4 supports auditing to keep track of how often, in what manner, and by whom shared resources are accessed, providing transparency and accountability in the resource sharing process. Further, the system 400 of FIG. 4 enables resource owners to determine which other users or devices may access the resource, resulting in an improved need-to-know procedure consistent with maintaining enterprise-wide security policies.

Figure 5:
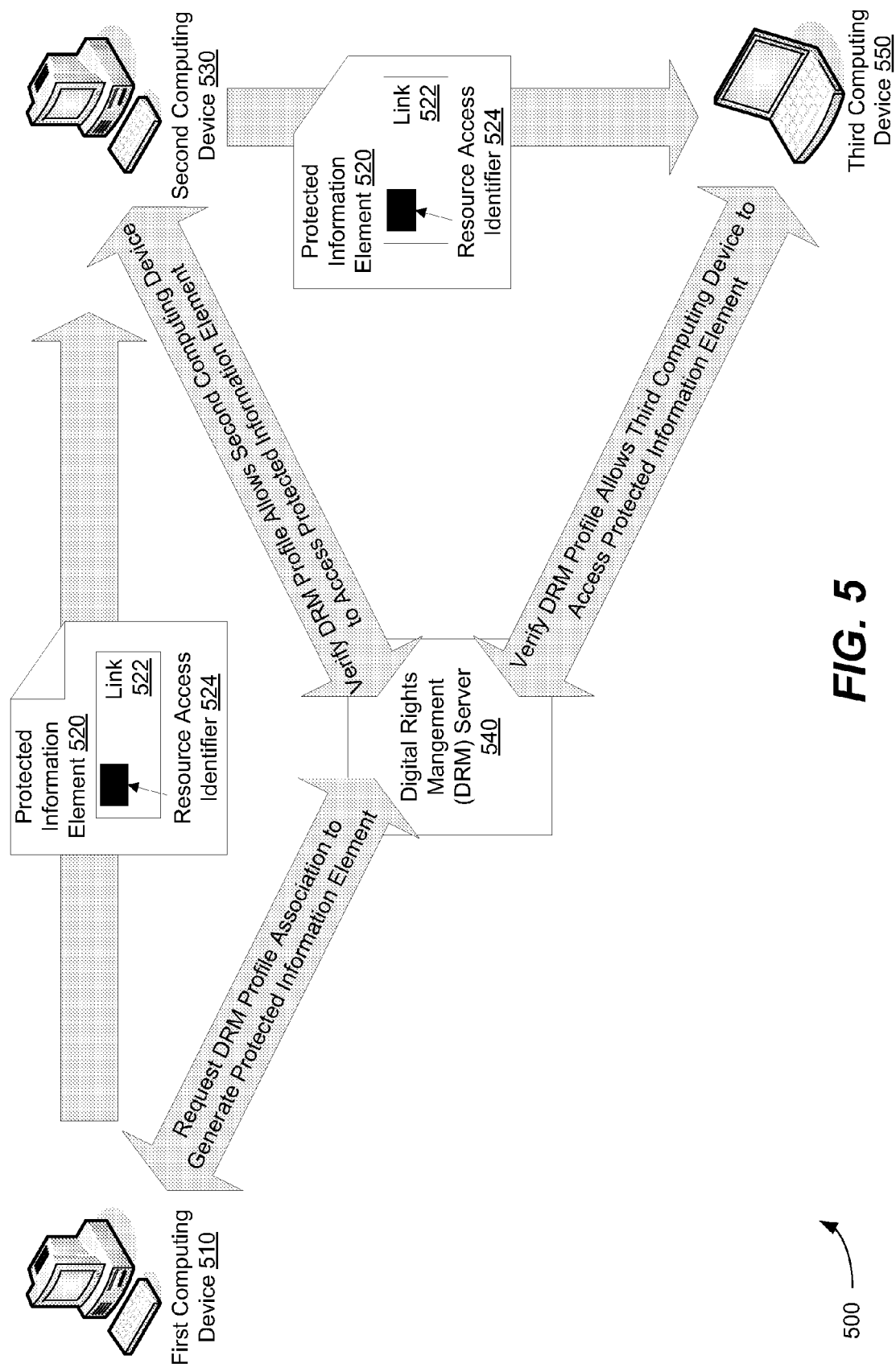
FIG. 5 is a block diagram of another particular embodiment of a system of access control that uses identifiers in links.

FIG. 5 is a block diagram of another particular embodiment of a system 500 of access control that uses identifiers in links. The system 500 of FIG. 5 includes a first computing device 510 capable of sending a protected information element 520 to a second computing device 530 and a third computing device 550 capable of receiving the protected information element 520 from the second computing device 530. The system also includes a digital rights management (DRM) server 540 that may receive DRM requests from and send DRM responses to each of the first computing device 510, the second computing device 530, and the third computing device 550. In an illustrative embodiment, the first computing device 510 is the first computing device 410 of FIG. 4, the second computing device 530 is the second computing device 430 of FIG. 4, and the third computing device 550 is the third computing device 450 of FIG. 4.

The first computing device 510 may generate the protected information element 520 by providing the DRM server 540 with a list of authorized devices for the protected information element 520 and requesting that the DRM server create a DRM profile for the protected information element 520 that includes the list of authorized devices. In a particular embodiment, the DRM profile may include the DRM profile 300 of FIG. 3. The protected information element 520 may include a link 522 to a shared computing resource and a resource access identifier 524 that is associated with the shared computing resource and embedded in the link 522. In an illustrative embodiment, the protected information element 520 is the protected information element 420 of FIG. 4, the link 522 is the link 422 of FIG. 4, and the resource access identifier 524 is the resource access identifier 424 of FIG. 4.

Both the second computing device 530 and the third computing device 550 may be configured to verify that the DRM profile associated with the protected information element 520 allows access the protected information element 520. In illustrative embodiment, the second computing device 530 may verify that information that identifies the second computing device 530 as either an owner or a collaborator with respect to the protected information element 520 is present in the DRM profile associated with the protected information element 520. In another illustrative embodiment, the third computing device 550 may verify that information that identifies the third computing device 550 as either an owner or a collaborator with respect to the protected information element 520 is present in the DRM profile associated with the protected information element 520.

The DRM server 540 may be configured to receive DRM requests and send DRM responses. A DRM request may include a list of authorized devices, a request to create a DRM profile for an information element, or a request to verify whether a particular computing device is authorized to access a protected information element. A DRM response may include an indication that a DRM profile for a particular information element has been created at the DRM server 540, whether or not a particular computing device is authorized to access a protected information element, and one or more access restrictions with respect to a protected information element.

In operation, the first computing device 510 may elect to associate an information element with a DRM profile to generate the protected information element 520. To do so, the first computing device 510 may send a request to the DRM server 540 requesting that a DRM profile be created for the information element, where the request includes a list of devices authorized to access the information element. In response to receiving the request, the DRM server 540 may generate a DRM profile for the information element and send the first computing device 510 a DRM response including an encryption key that may be used to encrypt the information element to generate the protected information element 520. The first computing device 510 may then send the protected information element 520 to the second computing device 530.

Upon receiving the protected information element 520, the second computing device 530 may determine that the protected information element 520 is encrypted and may send a DRM request for a decryption key to the DRM server 540. The DRM server 540 may receive the DRM request for the decryption key from the second computing device 530 and determine whether the second computing device 530 is listed in the DRM profile for the protected information element 520. In a particular embodiment, the DRM server 540 determines that the second computing device 530 is authorized to access the protected information element 520 and sends a DRM response to the second computing device 530 that includes the decryption key. In another particular embodiment, the DRM server 540 determines that the second computing device 530 is not authorized to access the protected information element 520 and sends a DRM response indicating a denial of access.

The second computing device 530 may forward the protected information element 520 to the third computing device 550. Upon receiving the protected information element 520, the third computing device 550 may determine that the protected information element 520 is encrypted and may send a DRM request for a decryption key to the DRM server 540. The DRM server 540 may receive the DRM request for the decryption key from the third computing device 550 and determine whether the third computing device 550 is listed in the DRM profile for the protected information element 520. In a particular embodiment, the DRM server 540 determines that the third computing device 550 is authorized to access the protected information element 520 and sends a DRM response to the third computing device 550 that includes the decryption key. In another particular embodiment, the DRM server 540 determines that the third computing device 550 is not authorized to access the protected information element 520 and sends a DRM response indicating a denial of access.

It will be appreciated that the system 500 of FIG. 5 centralizes access control for information elements at a DRM server, simplifying the logic at computing devices. For example, when the DRM server 540 of FIG. 5 is used, the logic to associate an access control scheme with an information element 116 of FIG. 1 may simply send a DRM request to the DRM server 540 asking that a DRM profile be associated with an information element and receive a DRM response from the DRM server 540 confirming that the requested DRM profile association has been completed.

Figure 6:
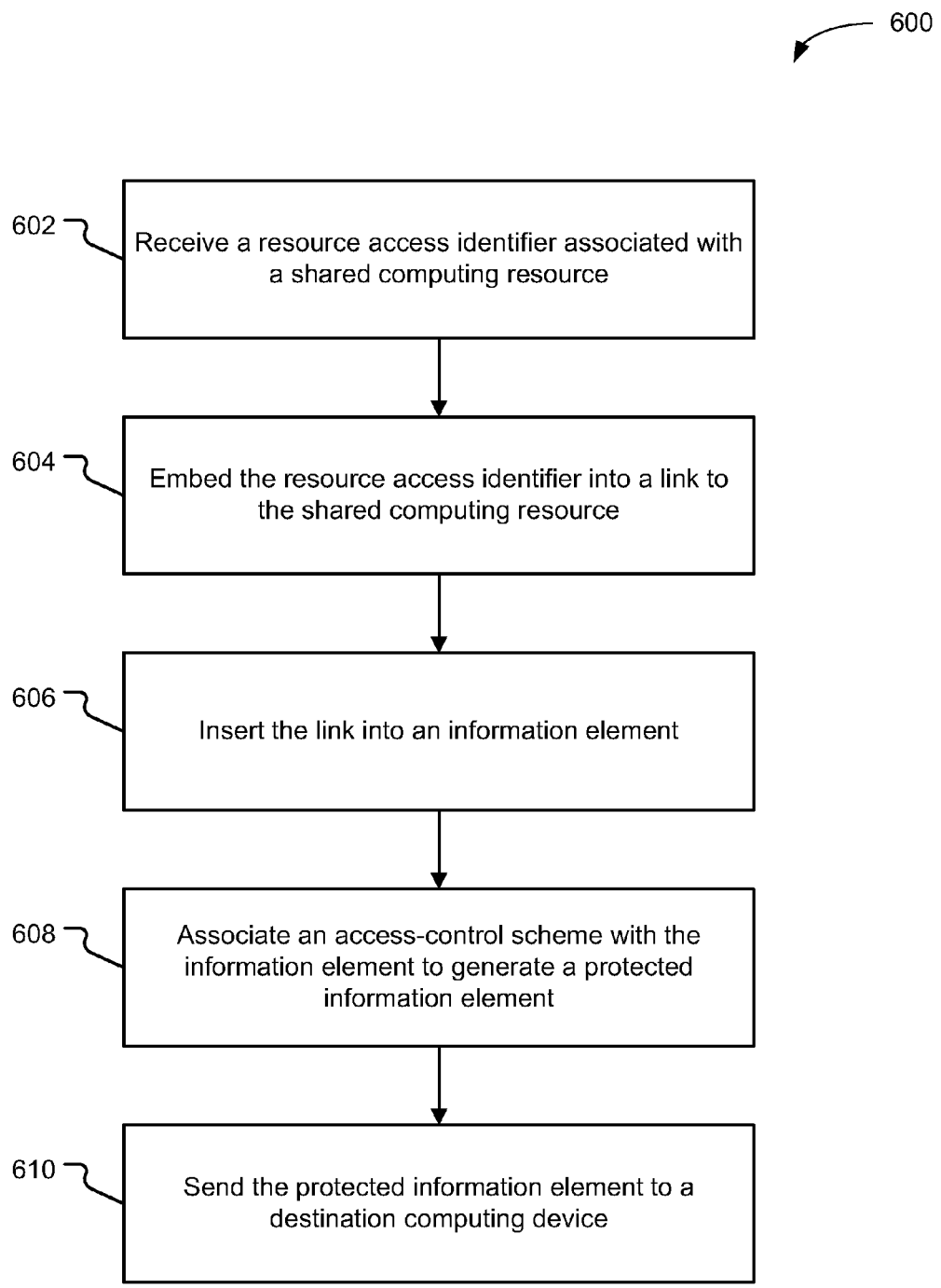
FIG. 6 is a flow diagram of a particular embodiment of an access control method that uses identifiers in links.

FIG. 6 is a flow diagram of a particular embodiment of an access control method 600 that uses identifiers in links. In an illustrative embodiment, the method may be performed by a computing, such as the first computing device 110 of FIG. 1, the first computing device 410 of FIG. 4, or the first computing device 510 of FIG. 5. The method 600 includes receiving a resource access identifier associated with a shared computing resource, at 602. For example, in FIG. 1, the first computing device 110 may receive the resource access identifier 124 associated with the shared computing resource 102. The method 600 also includes embedding the resource access identifier into a link to the shared computing resource, at 604, and inserting the link into an information element, at 606. For example, in FIG. 1, the first computing device 110 may embed the resource access identifier 124 into the link 122 to the shared computing resource 102 and insert the link 122 into an information element.

The method 600 also includes associating an access control scheme with the information element to generate a protected information element, at 608. For example, in FIG. 1, the first computing device 110 may associate an access control scheme with the information element containing the link 122 with the embedded resource access identifier 124 to generate the protected information element 120. The method 600 also includes sending the protected information element to a destination computing device, at 610. For example, in FIG. 1, the first computing device 110 may send the protected information element 120 to the second computing device 130 via the network interface 118.

It will be appreciated that the method 600 of FIG. 6 enables access control using identifiers in links. It will also be appreciated that the method 600 of FIG. 6 achieves access control without transmitting the shared computing resource from one computing device to another. Instead, a protected information element that includes a link to the shared computing resource with an embedded resource access identifier is transmitted. For example, instead of transmitting multiple shared documents, an e-mail or instant message that includes one or more links to the shared documents with an embedded resource access identifiers can be transmitted. As information elements are generally much smaller than shared resources, this reduces the amount of data that is transferred between computing devices to achieve access control.

Figure 7:
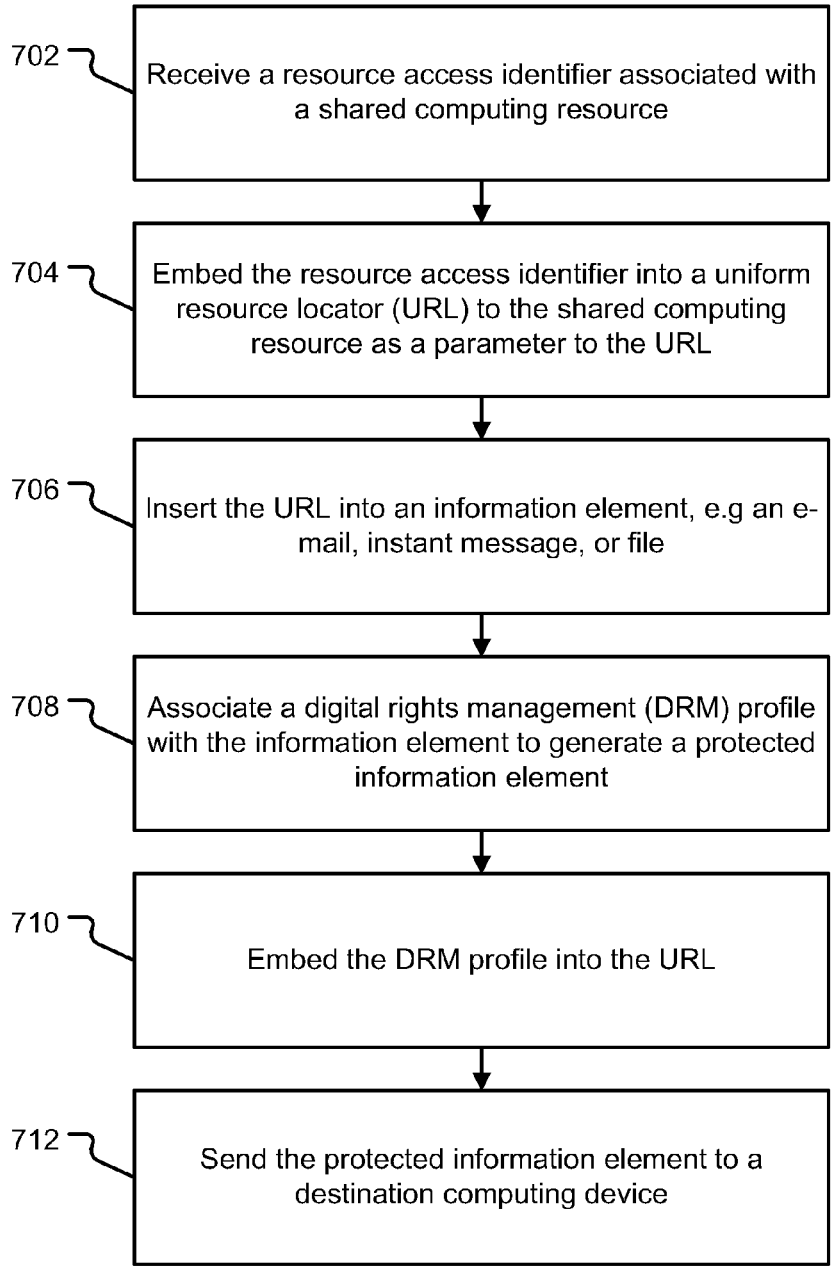
FIG. 7 is a flow diagram of another particular embodiment of an access control method that uses identifiers in links.

FIG. 7 is a flow diagram of another particular embodiment of an access control method 700 that uses identifiers in links. In an illustrative embodiment, the method may be performed by a computing device, such as the first computing device 110 of FIG. 1, the first computing device 410 of FIG. 4, or the first computing device 510 of FIG. 5. The method 700 includes receiving a resource access identifier associated with a shared computing resource, at 702. For example, at FIG. 4, the first computing device 410 may receive, from the access gateway 460, the resource access identifier 424 associated with the shared computing resource 402. The method 700 also includes embedding the resource access identifier into a uniform resource locator (URL) to the shared computing resource as a parameter of the URL, at 704. For example, in FIG. 4, the first computing device 410 may embed the resource access identifier 424 into the link 422 as a parameter of the link 422, where the link 422 is a URL. The method also includes inserting the URL into an information element (e.g., an e-mail, instant message, or file), at 706. For example, the first computing device 410 of FIG. 4 may insert the URL into an information element.

The method 700 also includes associating a digital rights management (DRM) profile with the information element to generate a protected information element, at 708. For example, the first computing device 410 of FIG. 4 may generate the protected information element 420 of FIG. 4 by requesting the DRM server 540 of FIG. 5 to create a DRM profile for the information element. The method also includes embedding the DRM profile into the URL, at 710. For example, the first computing device 410 of FIG. 4 may receive the created DRM profile from the DRM server 540 of FIG. 5, and may embed the copy of the DRM profile 300 of FIG. 3 into the URL. The method 700 also includes sending the protected information element to a destination computing device, at 712. For example, in FIG. 4, the first computing device 410 may send the protected information element 420 to the second computing device 430.

It will be appreciated that the method 700 of FIG. 7 provides persistent protection for a shared computing resource that is accessible via a URL by embedding both the resource access identifier and the DRM profile into the URL. In a particular embodiment, the resource access identifier and the DRM profile may be interwoven and embedded into the link as a joint parameter to the URL, so that the resource access identifier may not be extracted from the link without extracting the DRM profile, and vice versa. By preventing one of the resource access identifier and the DRM profile from being extracted without extracting the other, the method 700 of FIG. 7 may prevent users from bypassing security by simply extracting the resource access identifier from the link, inserting it into a new link, and forwarding the new link in an unprotected information element.

Figure 8:
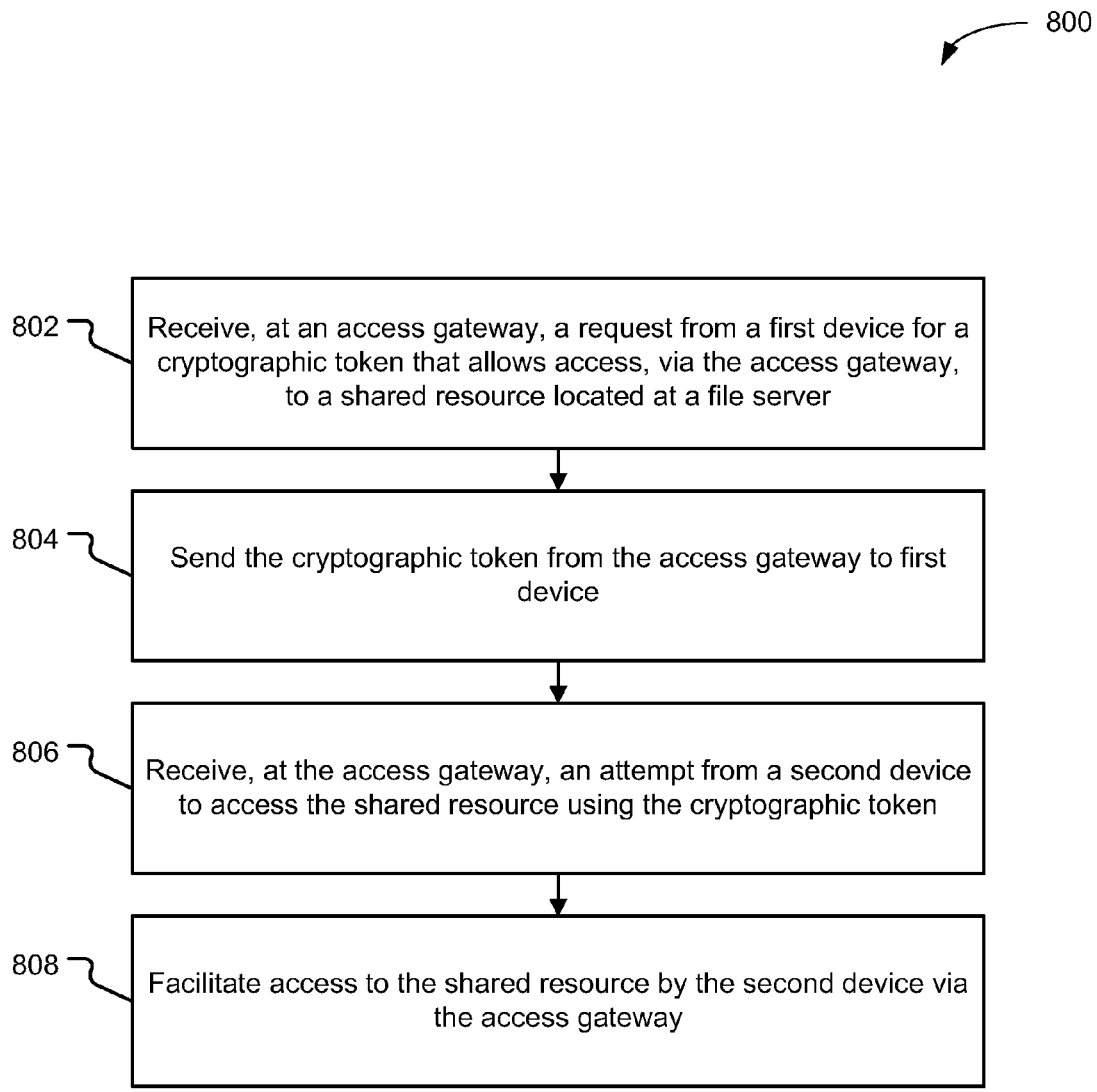
FIG. 8 is a flow diagram of a particular embodiment of a method of implementing access control using identifiers in links at an access gateway.

FIG. 8 is a flow diagram of a particular embodiment of a method 800 of implementing access control using identifiers in links at an access gateway. In an illustrative embodiment, the method 800 may be performed by the access gateway 460 of FIG. 4. The method 800 includes receiving a request for a cryptographic token that allows access to a shared resource located at a file server via an access gateway, at 802. The request is sent by a first device and is received at the access gateway. For example, in FIG. 4, the access gateway 460 may receive a request from the first computing device 410 for the resource access identifier 424, where the resource access identifier 424 is a cryptographic token. The method 800 also includes sending the cryptographic token from the access gateway to the first device, at 804. For example, in FIG. 4, the access gateway 460 may send the resource access identifier 424 (e.g., a cryptographic token) to the first computing device 410. The method 800 also includes receiving, at the access gateway, an attempt from a second computing device to access the shared resource using the cryptographic token, at 806. For example, in FIG. 4, the access gateway 460 may receive an access request from the second computing device 430, where the access request is made using the resource access identifier 424 that is a cryptographic token. The method 800 also includes facilitating access to the shared resource by the second device via the access gateway, at 808. For example, in FIG. 4, the access gateway 460 may facilitate access between the second computing device 430 and the shared resource 402 via the access gateway 460.

It will be appreciated that the method 800 of FIG. 8 enables an access gateway to control access to shared resources because the access gateway is responsible for both generating resource access identifiers for the shared resources as well as facilitating access to the shared resources. It will also be appreciated that the method 800 of FIG. 8 adds security to resource access identifiers by generating resource access identifiers as cryptographic tokens, because cryptographic tokens are difficult to decrypt.

Figure 9:
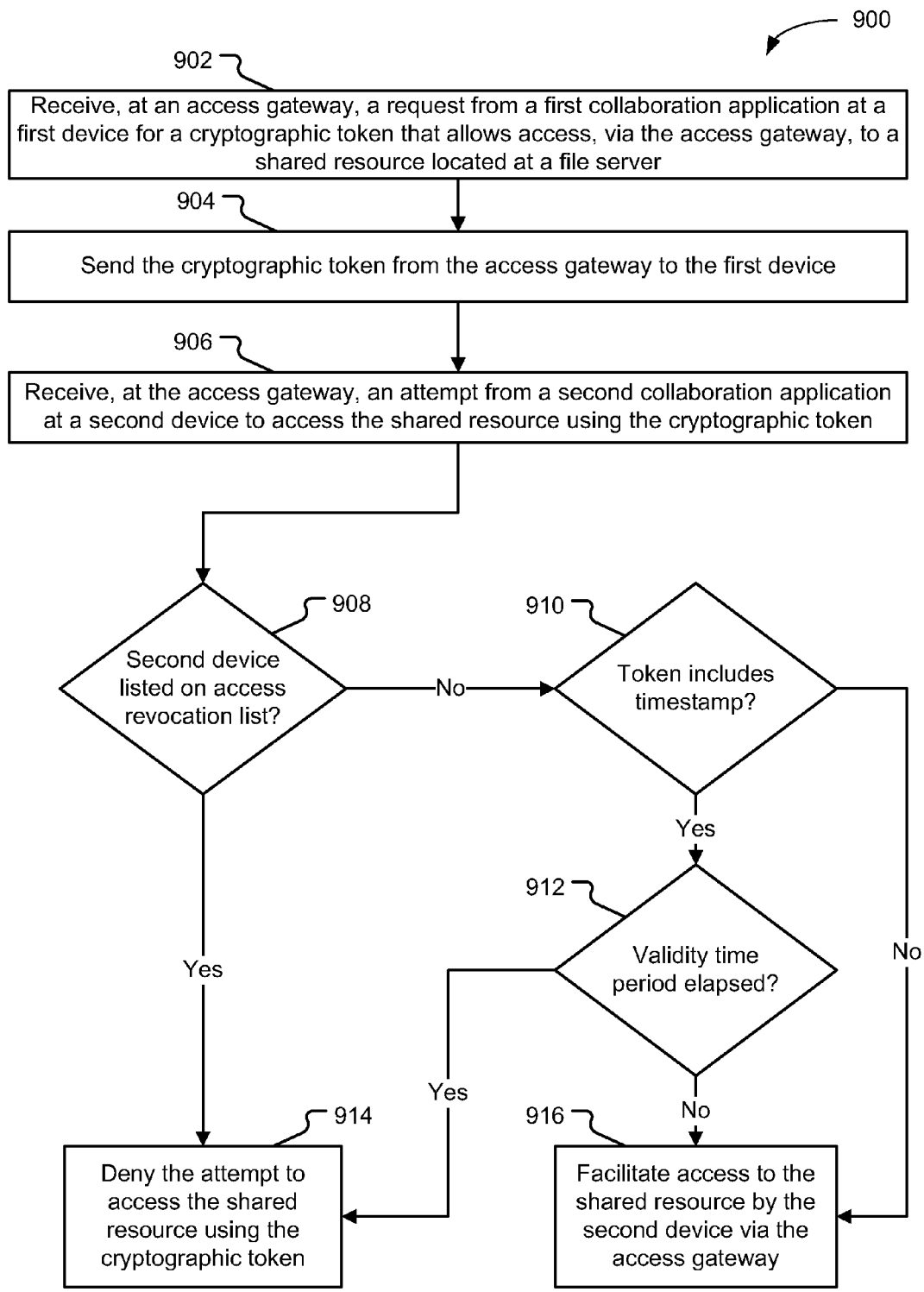
FIG. 9 is a flow diagram of another particular embodiment of a method of implementing access control using identifiers in links at an access gateway.

FIG. 9 is a flow diagram of another particular embodiment of a method 900 of implementing access control using identifiers in links at an access gateway. In an illustrative embodiment, the method 900 may be performed at the access gateway 460 of FIG. 4. The method 900 includes receiving a request for a cryptographic token that allows access to a shared resource located at a file server via an access gateway, at 902. The request is sent by a first collaboration application at a first device and received by the access gateway. Collaboration applications include, but are not limited to e-mail applications, word processing applications, spreadsheet applications, presentation applications, web browsers, file sharing applications, and multimedia application applications. For example, in FIG. 4, the access gateway 460 may receive a request for the resource access identifier 424 from a first collaboration application at the first computing device 410. The method 900 also includes sending the cryptographic token from the access gateway to the first device, at 904. For example, in FIG. 4, the access gateway 460 may send the resource access identifier 424 to the first computing device 410.

The method 900 also includes receiving, at the access gateway, an attempt to access the shared resource using the cryptographic token, at 906. The request is sent by a second collaboration application at a second device. For example, in FIG. 4, the access gateway 460 may receive an access request from a second collaboration application at the second computing device 430, where the access request uses the resource access identifier 424.

The method 900 includes determining whether the second device is listed on an access revocation list, at 908. In a particular embodiment, the access revocation list may include a list of users, a list of devices, a list of enterprise roles, or any combination thereof. For example, in FIG. 4, the access gateway 460 may determine whether the second computing device 430 is listed in the access revocation list 464. When it is determined that the second device is listed on the access revocation list, the method 900 proceeds to 914, where the attempt to access the shared resource using the cryptographic token is denied. For example, in FIG. 4, when the second computing device 430 is listed in the access revocation list 464, the access gateway 460 may deny the access request from the second collaboration application at the second computing device 430.

When it is determined that the second device is not listed on the access revocation list, the method 900 advances to 910 and determines whether the cryptographic token includes a timestamp. For example, in FIG. 4, when the second computing device 430 is not listed in the access revocation list 464, the access gateway 460 may determine whether the resource access identifier 424 includes a timestamp, such as the timestamp 212 of FIG. 2. When it is determined that the cryptographic token does not include a timestamp, the method 900 proceeds to 916, and access to the shared resource by the second device is facilitated via the access gateway. For example, in FIG. 4, when the resource access identifier 424 does not include the timestamp 212 of FIG. 2, the access gateway 460 may facilitate access to the shared computing resource 402 by the second computing device 430 via the access gateway 460.

When it is determined that the cryptographic token includes a timestamp, the method 900 advances to 912 and includes determining whether a validity time period has elapsed. For example, in FIG. 4, when the resource access identifier 424 includes the timestamp 212 of FIG. 2, the access gateway 460 may determine whether the resource access identifier 424 has expired because a validity time period from the time indicated in the timestamp 212 of FIG. 2 has elapsed. When it is determined that the validity time period has elapsed, the method 900 ends at 914, and the attempt to access the shared resource using the cryptographic token is denied. For example, if the validity time period has elapsed, the access gateway 460 of FIG. 4 may deny the access request from the second collaboration application at the second computing device 430. When it is determined that the validity time period has not elapsed, the method 900 ends at 916 by facilitating access to the shared resource by the second device via the access gateway. For example, in FIG. 4, if the predefined validity time period has not elapsed, the access gateway 460 may facilitate access to the shared computing resource 402 by the second computing device 430 via the access gateway 460.

It will be appreciated that the method 900 of FIG. 9 enables resource owners to revoke previously granted access to shared resources by using an access revocation list. It will also be appreciated that the method 900 of FIG. 9 enables the automatic expiration of resource access identifiers, so that resource owners do not have to worry about "stale" resource access identifiers being used by parties that may no longer be collaborators of the resource owners.

Figure 10:
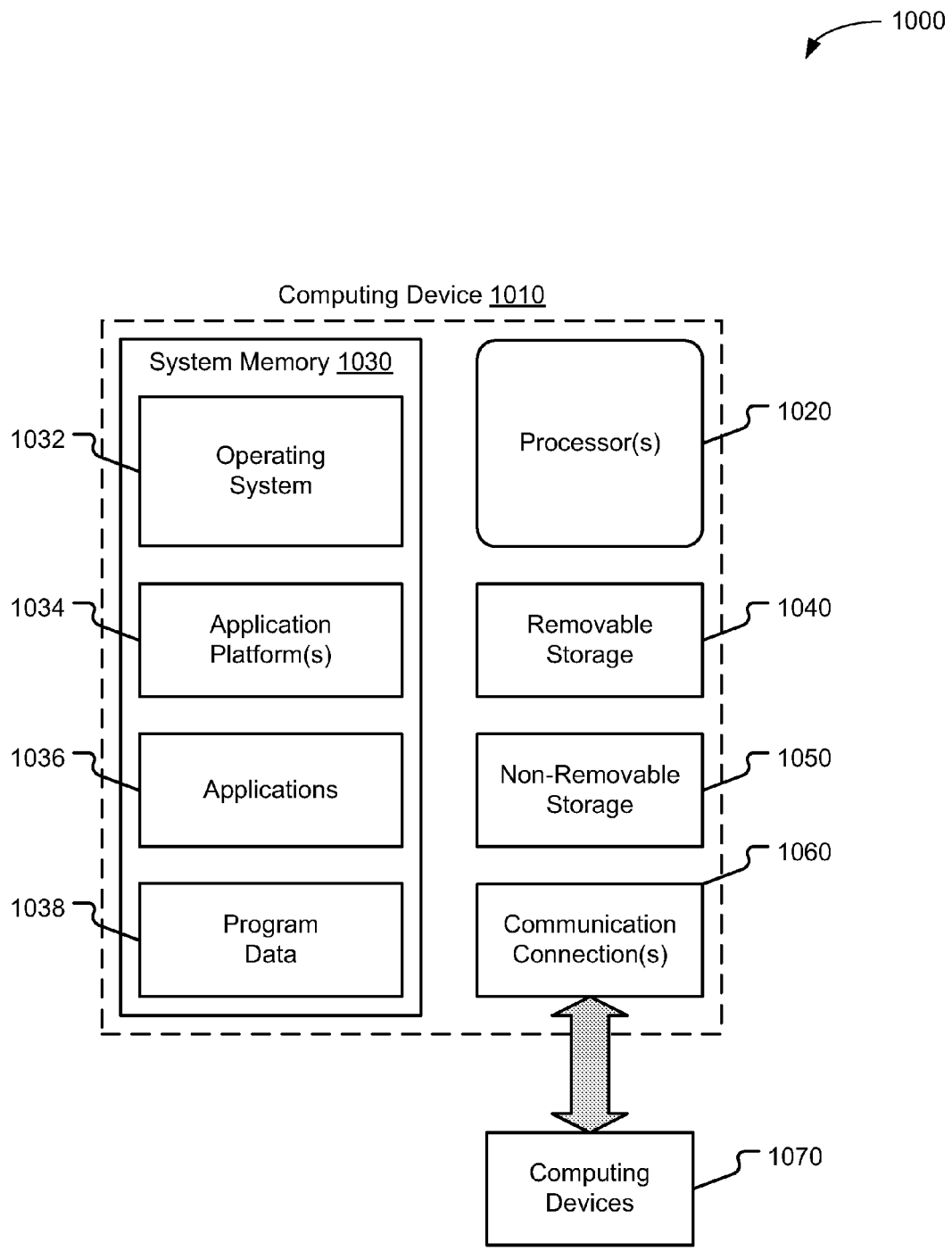
FIG. 10 is a block diagram of a computing environment including a computing device to support embodiments of computer-implemented methods, computer program products, and system components as illustrated in FIGS. 1-9.

FIG. 10 shows a block diagram of a computing environment 1000 including an computing device 1010 operable to support embodiments of computer-implemented methods, computer program products, and system components according to the present disclosure. In an illustrative embodiment, the computing device 1010 may include an access gateway, such as the access gateway 460 of FIG. 4. In another illustrative embodiment, the computing device 1010 may include the computing device 110 or 130 of FIG. 1, 410, 430, or 450 of FIG. 4, or 510, 530, or 550 of FIG. 5. In another illustrative embodiment, the computing device 1010 may include the DRM server 540 of FIG. 5. For example, the computing device 1010 may be a desktop computer, a laptop computer, a collaboration server, a personal digital assistant, or a mobile communication device.

The computing device 1010 typically includes at least one processor 1020 and system memory 1030. Depending on the exact configuration and type of access gateway, the system memory 1030 may be volatile (such as random access memory or "RAM"), non-volatile (such as read-only memory or "ROM," flash memory, and similar memory devices that maintain the data they store even when power is not provided to them) or some combination of the two. The system memory 1030 typically includes an operating system 1032, one or more application platforms 1034, one or more applications 1036, and may include program data 1038. In a particular embodiment, the system memory 1030 may include the resource access identifier generation logic 462 of FIG. 4 and the access revocation list 464 of FIG. 4.

The computing device 1010 may also have additional features or functionality. For example, the computing device 1010 may also include removable and/or non-removable additional data storage devices such as magnetic disks, optical disks, tape, and standard-sized or miniature flash memory cards. Such additional storage is illustrated in FIG. 10 by removable storage 1040 and non-removable storage 1050. Computer storage media may include volatile and/or non-volatile storage and removable and/or non-removable media implemented in any method or technology for storage of information such as computer-readable instructions, data structures, program components or other data. The system memory 1030, the removable storage 1040 and the non-removable storage 1050 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium which can be used to store the desired information and which can be accessed by the computing device 1010. Any such computer storage media may be part of the device 1010.

The computing device 1010 also contains one or more communication connections 1060 that allow the computing device 1010 to communicate with other computing devices 1070, such as one or more client computing systems or other servers, over a wired or a wireless network. In a particular embodiment where the computing device 1010 includes the access gateway 460, the computing device 1010 may communicate with the first computing device 410 of FIG. 4, the second computing device 430 of FIG. 4, the third computing device 450 of FIG. 4, the file server 404 of FIG. 4, and the auditing engine 470 of FIG. 4. The one or more communication connections 1060 are an example of communication media. By way of example, and not limitation, communication media may include wired media such as a wired network or direct-wired connection, and wireless media such as acoustic, RF, infrared and other wireless media. It will be appreciated, however, that not all of the components or devices illustrated in FIG. 10 or otherwise described in the previous paragraphs are necessary to support embodiments as herein described.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor or the processor and the storage medium may reside as discrete components in a access gateway or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
   receiving a resource access identifier at a first end user computing device, the resource access identifier associated with a shared computing resource located at a file server;
   embedding the resource access identifier into a link to the shared computing resource;
   inserting the link into an information element;
   associating an access control scheme with the information element at the first end user computing device, such that the first end user computing device issues a protected information element, wherein the protected information element is encrypted; and
   sending the protected information element from the first end user computing device to a destination end user computing device to enable the destination end user computing device to use the resource access identifier to access the shared computing resource from the file server, wherein the first end user computing device is distinct from the destination end user computing device, the first end user computing device is distinct from the file server, and the destination end user computing device is distinct from the file server.

2. The method of claim 1, wherein the information element includes an e-mail or an instant message, and wherein the resource access identifier includes a cryptographic token having a signature that is useable to detect modification of the resource access identifier.

3. The method of claim 1, wherein the resource access identifier is a cryptographic token, and wherein the resource access identifier is associated with the same file server for the first end user computing device and for the destination end user computing device.

4. The method of claim 1, wherein the link is a uniform resource locator (URL), wherein the resource access identifier is embedded in the URL as a parameter of the URL.

5. The method of claim 1, wherein the resource access identifier includes information associated with a sender of a request for the resource access identifier comprising at least one of: information associated with a computing device that sent the request for the resource access identifier and information associated with a user that sent the request for the resource access identifier.

6. The method of claim 1, wherein the resource access identifier includes information regarding rights associated with the shared computing resource comprising a right to read the shared computing resource, a right to write to the shared computing resource, a right to modify the shared computing resource, or any combination thereof.

7. The method of claim 1, wherein the resource access identifier includes a signature to prevent modification of the resource access identifier.

8. The method of claim 1, wherein the access control scheme associated with the information element is a digital rights management (DRM) profile that includes information regarding one or more owners of the shared computing resource, information regarding one or more collaborators of the one or more owners of the shared computing resource, or one or more access restrictions associated with the shared computing resource.

9. The method of claim 8, wherein the DRM profile associated with the information element is embedded in the link.

10. The method of claim 1, wherein the shared computing resource is retrievable from the file server that is accessible through an access gateway.

11. A system comprising:
a first end user computing device configured to:
   send a request for a resource access identifier that allows access to a shared resource located at a file server;
   receive the resource access identifier;
   embed the resource access identifier into a link;
   insert the link into an information element, wherein the information element is encrypted;
   associate an access control scheme with the information element; and
a network interface at the first end user computing device to send the information element to a second end user computing device that is capable of verifying that the access control scheme associated with the information element allows access to the information element to enable the second end user computing device to use the resource access identifier to access the shared resource from the file server, wherein the first end user computing device is distinct from the second end user computing device, the first end user computing device is distinct from the file server, the second end user computing device is distinct from the file server, and the resource access identifier is associated with the same file server for the first end user computing device and the second end user computing device.

12. The system of claim 11, further comprising an access gateway capable of receiving the request for the resource access identifier from the first end user computing device, sending the resource access identifier to the first end user computing device, and facilitating access to the shared resource by the second end user computing device.

13. The system of claim 12, further comprising an auditing engine capable of logging resource access identifier requests and shared resource access information in an audit log.

14. The system of claim 13, wherein
the access gateway is further capable of:
   maintaining an access revocation list associated with the shared resource;
   determining that information identifying a third computing device is listed on the access revocation list;
   receiving an attempt by the third computing device to access the shared resource; and
   denying the attempt by the third computing device to access the shared resource; and
wherein the auditing engine is further capable of storing failed resource access attempts in the audit log.

15. The system of claim 11, wherein the second end user computing device is further capable of forwarding the information element to a third computing device, wherein the access control scheme associated with the information element allows access to the information element at the third computing device, and wherein the third computing device is capable of using the resource access identifier to access the shared resource.

16. A computer-readable storage device comprising instructions, that when executed by a processor of an access gateway, cause the processor to:
   receive, at the access gateway, a request from a first end user device for a cryptographic token that allows access, via the access gateway, to a shared resource located at a file server;
   send the cryptographic token via a link, the cryptographic token embedded in the link, from the access gateway to the first end user device for the first end user device to use the cryptographic token to access the shared resource and for the first end user device to provide the cryptographic token to a second end user device in an information element, wherein the information element is encrypted, the information element issued by the first end user device and associated with an access-control scheme;
   receive, at the access gateway, an attempt from the second end user device to access the shared resource using the cryptographic token; and
   facilitate access to the shared resource by the second end user device via the access gateway after a first indication based on the access-control scheme associated with the information element indicates that the second end user device is permitted to access the shared resource and after a second indication based on the cryptographic token indicates that the second end user device is permitted to access the shared resource, wherein the first end user device is distinct from the second end user device, the first end user device is distinct from the file server, the second end user device is distinct from the file server, and the cryptographic token associated with the shared resource is associated with the same file server for the first end user device and the second end user device.

17. The computer-readable storage device of claim 16, further comprising instructions, that when executed by the processor, cause the processor to:
   determine that the cryptographic token includes a timestamp; and
   deny an attempt to access the shared resource using the cryptographic token when a validity time period associated with the cryptographic token has elapsed.

18. The computer-readable storage device of claim 16, wherein the first end user device and the second end user device includes a desktop computer, a laptop computer, a personal digital assistant, or a mobile communication device.

19. The computer-readable storage device of claim 16, wherein the request from the first end user device for the cryptographic token is initiated by a first collaboration application at the first end user device, and wherein the attempt from the second end user device to access the shared resource is initiated by a second collaboration application at the second end user device.

20. The computer-readable storage device of claim 19, wherein the first collaboration application or the second collaboration application includes an e-mail application, a word processing application, a spreadsheet application, a presentation application, a web browser, a file sharing application, or a multimedia application.

* * * * *